US008290189B2

(12) United States Patent
Kellermann et al.

(10) Patent No.: US 8,290,189 B2
(45) Date of Patent: Oct. 16, 2012

(54) BLIND SOURCE SEPARATION METHOD AND ACOUSTIC SIGNAL PROCESSING SYSTEM FOR IMPROVING INTERFERENCE ESTIMATION IN BINAURAL WIENER FILTERING

(75) Inventors: Walter Kellermann, Eckental (DE); Yuanhang Zheng, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

(21) Appl. No.: 12/691,015

(22) Filed: Jan. 21, 2010

(65) Prior Publication Data

US 2010/0183178 A1 Jul. 22, 2010

(30) Foreign Application Priority Data

Jan. 21, 2009 (EP) .................................... 09000799

(51) Int. Cl.

*H04B 15/00* (2006.01)
*H04R 25/00* (2006.01)
*H04R 1/02* (2006.01)

(52) U.S. Cl. .................... 381/317; 381/71.11; 381/94.1; 381/91; 381/320

(58) Field of Classification Search .................. 381/312, 381/317, 318, 320, 321, 71.1, 71.11, 91, 381/94.1

See application file for complete search history.

(56) References Cited

U.S. PATENT DOCUMENTS 7,171,008 B2 * 1/2007 Elko .............................. 381/92
7,464,029 B2 12/2008 Visser et al.
2006/0120535 A1 6/2006 Puder
2007/0021958 A1 1/2007 Visser et al.

(Continued)

FOREIGN PATENT DOCUMENTS

WO 2007128825 A1 11/2007

OTHER PUBLICATIONS

European Search Report dated May 8, 2009.

(Continued)

*Primary Examiner* — Davetta W Goins
*Assistant Examiner* — Phylesha Dabney
(74) *Attorney, Agent, or Firm* — Laurence A. Greenberg; Werner H. Stemer; Ralph E. Locher

(57) ABSTRACT

A method and an acoustic signal processing system for noise reduction of a binaural microphone signal ($x_1$, $x_2$) with one target point source and M interfering point sources ($n_1$, $n_2$, . . . , $n_M$) as input sources to a left and a right microphone of a binaural microphone system, include:

filtering a left and a right microphone signal by a Wiener filter to obtain binaural output signals of a target point source, where the Wiener filter is calculated as:

$$H_W = 1 - \frac{\Phi_{(x_{1,n}+x_{2,n})(x_{1,n}+x_{2,n})}}{\Phi_{(x_1+x_2)(x_1+x_2)}},$$

where $H_W$ is the Wiener filter, $\Phi_{(x_{1,n}+x_{2,n})(x_{1,n}+x_{2,n})}$ is the auto power spectral density of the sum of all of the M interfering point sources components (x1,n, x2,n) contained in the left and right microphone signals and $\Phi_{(x_1+x_2)(x_1+x_2)}$ is the auto power spectral density of the sum of the left and right microphone signals. Due to the linear-phase property of the calculated Wiener filter, original binaural cues are perfectly preserved not only for the target source but also for the residual interfering sources.

9 Claims, 2 Drawing Sheets

U.S. PATENT DOCUMENTS

2010/0246850 A1* 9/2010 Puder ........................... 381/94.1
2011/0305345 A1* 12/2011 Bouchard et al. ............ 381/23.1

OTHER PUBLICATIONS

Yu Takahashi, et al., "Blind Source Extraction for Hands-Free Speech Recognition Based on Wiener Filtering and ICA-Based Noise Estimation," Nara Institute of Science and Technology, Nara 630-0192, 2008, pp. 164-167, Japan.

Erik Visser, et al., "Speech Enhancement Using Blind Source Separation and Two-Channel Energy Based Speaker Detection", Institute for Neural Computation, University of California, San Diego, 2003, pp. 884-887, California.

* cited by examiner

BLIND SOURCE SEPARATION METHOD AND ACOUSTIC SIGNAL PROCESSING SYSTEM FOR IMPROVING INTERFERENCE ESTIMATION IN BINAURAL WIENER FILTERING

CROSS-REFERENCE TO RELATED APPLICATION

This application claims the priority, under 35 U.S.C. §119, of European Patent Application EP 090 00 799, filed Jan. 21, 2009; the prior application is herewith incorporated by reference in its entirety.

BACKGROUND OF THE INVENTION

Field of the Invention

The present invention relates to a method and an acoustic signal processing system for noise reduction of a binaural microphone signal with one target point source and several interfering point sources as input sources to a left and a right microphone of a binaural microphone system. Specifically, the present invention relates to hearing aids employing such methods and devices.

In the present document, reference will be made to the following documents:

[BAK05] H. Buchner, R. Aichner, and W. Kellermann. A generalization of blind source separation algorithms for convolutive mixtures based on second-order statistics. IEEE Transactions on Speech and Audio Signal Processing, January 2005.

[PA02] L. C. Parra and C. V. Alvino. Geometric source separation: Merging convolutive source separation with geometric beamforming. IEEE Transactions on Speech and Audio Processing, 10(6):352{362, September 2002.

In signal enhancement tasks, adaptive Wiener Filtering is often used to suppress background noise and interfering sources. Several approaches are proposed for required interference and noise estimates, usually exploiting VAD (Voice Activity Detection), and beam-forming, which uses a microphone array with a known geometry. The drawback of VAD is that the voice-pause cannot be robustly detected, especially in the multi-speaker environment. The beam-former does not rely on the VAD, nevertheless, it needs a priori information about the source positions. As an alternative method, Blind Source Separation (BSS) was proposed to be used in speech enhancement, which overcomes the drawbacks mentioned and drastically reduces the number of microphones. However, the limitation of BSS is that the number of point sources cannot be larger than the number of microphones, or else BSS is not capable of separating the sources.

SUMMARY OF THE INVENTION

It is accordingly an object of the invention to provide a blind source separation method and an acoustic signal processing system for improving interference estimation in binaural Wiener filtering, which overcome the hereinafore-mentioned disadvantages of the heretofore-known methods and systems of this general type and which improve interference estimation in binaural Wiener Filtering in order to effectively suppress background noise and interfering sources.

With the foregoing and other objects in view there is provided, in accordance with the invention, a method for noise reduction of a binaural microphone signal. One target point source and M interfering point sources are input sources to a left and a right microphone of a binaural microphone system. The method includes the following step:

filtering a left and a right microphone signal by a Wiener filter to obtain binaural output signals of the target point source, where the Wiener filter is calculated as:

$$H_W = 1 - \frac{\Phi_{(x_{1,n}+x_{2,n})(x_{1,n}+x_{2,n})}}{\Phi_{(x_1+x_2)(x_1+x_2)}},$$

where $H_W$ is the Wiener filter transfer function $\Phi_{(x_{1,n}+x_{2,n})(x_{1,n}+x_{2,n})}$ is the auto power spectral density of the sum of all of the M interfering point sources components contained in the left and right microphone signals and $\Phi_{(x_1+x_2)(x_1+x_2)}$ is the auto power spectral density of the sum of the left and right microphone signals.

Due to the linear-phase property of the calculated Wiener filter $H_W$, original binaural cues based on signal phase differences are perfectly preserved not only for the target source but also for the residual interfering sources.

In accordance with another mode of the invention, the sum of all of the M interfering point sources components contained in the left and right microphone signals is approximated by an output of a Blind Source Separation system with the left and right microphone signals as input signals.

In accordance with a further mode of the invention, the Blind Source Separation includes a Directional Blind Source Separation Algorithm and a Shadow Blind Source Separation algorithm.

With the objects of the invention in view, there is also provided an acoustic signal processing system, including a binaural microphone system with a left and a right microphone and a Wiener filter unit for noise reduction of a binaural microphone signal with one target point source and M interfering point sources as input sources to the left and the right microphone. The Wiener filter unit is calculated as:

$$H_W = 1 - \frac{\Phi_{(x_{1,n}+x_{2,n})(x_{1,n}+x_{2,n})}}{\Phi_{(x_1+x_2)(x_1+x_2)}},$$

Where $\Phi_{(x_{1,n}+x_{2,n})(x_{1,n}+x_{2,n})}$ is the auto power spectral density of the sum of all of the M interfering point sources components contained in the left and right microphone signals and $\Phi_{(x_1+x_2)(x_1+x_2)}$ is the auto power spectral density of the sum of the left and right microphone signals, and the left microphone signal of the left microphone and the right microphone signal of the right microphone are filtered by the Wiener filter to obtain binaural output signals of the target point source.

In accordance with another feature of the invention, the acoustic signal processing system includes a Blind Source Separation unit, where the sum of all of the M interfering point source components contained in the left and right microphone signals is approximated by an output of the Blind Source Separation unit with the left and right microphone signals as input signals.

In accordance with a further feature of the invention, the Blind Source Separation unit includes a Directional Blind Source Separation unit and a Shadow Blind Source Separation unit.

In accordance with a concomitant feature of the invention, the left and right microphones of the acoustic signal processing system are located in different hearing aids.

Other features which are considered as characteristic for the invention are set forth in the appended claims.

Although the invention is illustrated and described herein as embodied in a blind source separation method and an acoustic signal processing system for improving interference estimation in binaural Wiener filtering, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
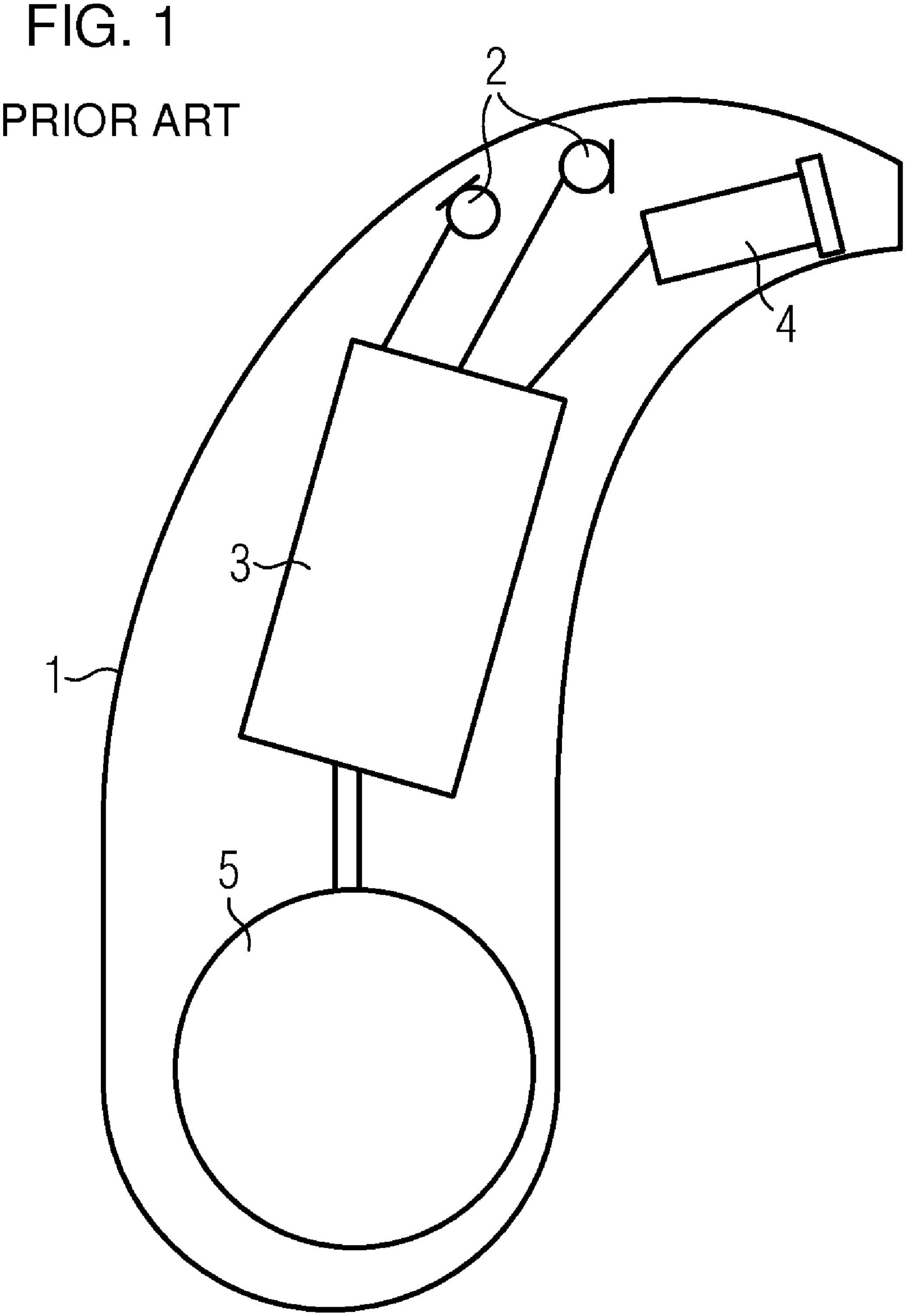
FIG. 1 PRIOR ART
FIG. 1 is a diagrammatic, plan view of a hearing aid according to the state of the art.

Referring now to the figures of the drawings in detail and first, particularly, to FIG. 1 thereof, there is seen a hearing aid which is briefly introduced in the next two paragraphs, since the present application is preferably applicable thereto.

Hearing aids are wearable hearing devices used for supplying aid to hearing impaired persons. In order to comply with numerous individual needs, different types of hearing aids, such as behind-the-ear hearing aids and in-the-ear hearing aids, e.g. concha hearing aids or hearing aids completely in the canal, are provided. The hearing aids listed above as examples are worn at or behind the external ear or within the auditory canal. Furthermore, the market also provides bone conduction hearing aids, implantable or vibrotactile hearing aids. In those cases, the affected hearing is stimulated either mechanically or electrically.

In principle, hearing aids have one or more input transducers, an amplifier and an output transducer, as important components. An input transducer usually is an acoustic receiver, e.g. a microphone, and/or an electromagnetic receiver, e.g. an induction coil. The output transducer normally is an electroacoustic transducer such as a miniature speaker or an electromechanical transducer such as a bone conduction transducer. The amplifier usually is integrated into a signal processing unit. Such a principle structure is shown in FIG. 1 for the example of a behind-the-ear hearing aid. One or more microphones 2 for receiving sound from the surroundings are installed in a hearing aid housing 1 for wearing behind the ear. A signal processing unit 3 is also installed in the hearing aid housing 1 and processes and amplifies signals from the microphone. An output signal of the signal processing unit 3 is transmitted to a receiver 4 for outputting an acoustical signal. Optionally, the sound will be transmitted to the ear drum of the hearing aid user through a sound tube fixed with an otoplastic in the auditory canal. The hearing aid and specifically the signal processing unit 3 are supplied with electrical power by a battery 5 which is also installed in the hearing aid housing 1.

In a preferred embodiment of the invention, two hearing aids, one for the left ear and one for the right ear, have to be used ("binaural supply"). The two hearing aids can communicate with each other in order to exchange microphone data.

If the left and right hearing aids include more than one microphone, any preprocessing that combines the microphone signals into a single signal in each hearing aid can use the invention.

Figure 2:
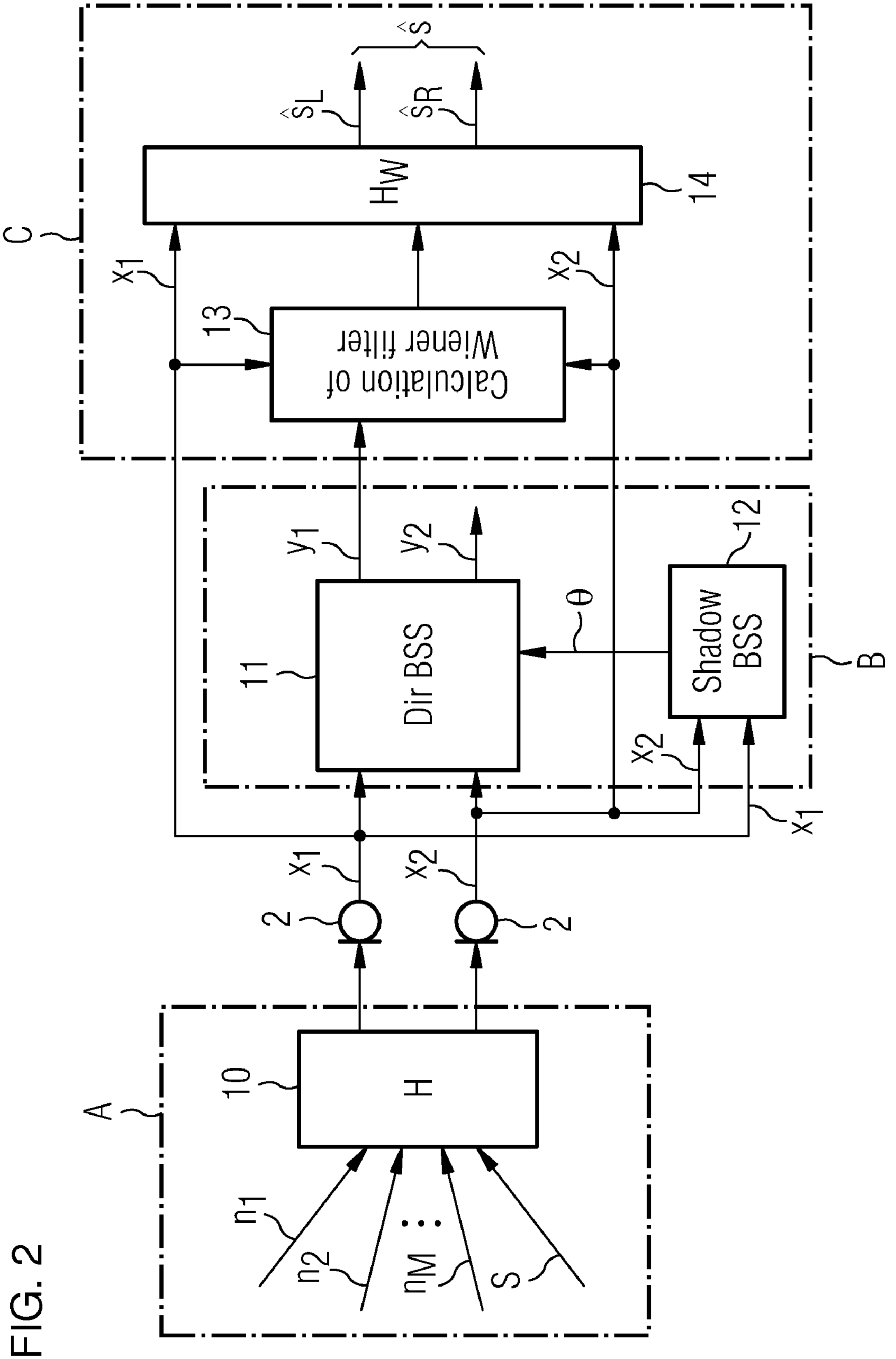
FIG. 2 is a block diagram of an acoustic scenario being considered and a signal processing system, according to the invention.

FIG. 2 shows the proposed system which is composed of three major components A, B and C. The first component A is a linear BSS model in an underdetermined scenario when more point sources s, $n_1, n_2, \ldots, n_M$ than microphones 2 are present. A directional BSS 11 is exploited to estimate the interfering point sources $n_1, n_2, \ldots, n_M$ in the second component B. Its major advantage is that it can deal with the underdetermined scenario. In the third component C, an estimated interference $y_1$ is used to calculate a time-varying Wiener filter 14 and then a binaural enhanced target signal $\hat{s}$ can be obtained by filtering binaural microphone signals $x_1$, $x_2$ with the calculated Wiener filter 14. Due to the linear-phase property of the calculated Wiener filter 14, original signal-phase-based binaural cues are perfectly preserved not only for the target source s but also for the residual interfering sources $n_1, n_2, \ldots n_M$. The application to hearing aids can especially benefit from this property. A detailed description of the individual components and experimental results will be presented in the following.

As is illustrated in FIG. 2, one target point source s and M interfering point sources $n_m$, where m=1, . . . , M are filtered by a linear multiple-input-multiple-output (MIMO) system 10 before they are picked up by two microphones 2. Thus, the microphone signals $x_1$, $x_2$ can be described in the discrete-time domain by:

$$x_j(k) = h_{1j}(k) * s(k) + \sum_{m=1}^{M} h_{m+1,j}(k) * n_m(k), \tag{1}$$

where "*" represents convolution, $h_{ij}$, where I=1, . . . , M+1 and j=1, 2, denotes a FIR filter model from the I-th source to the j-th microphone and $x_1$, $x_2$ denote the left and right microphone signal for use as a binaural microphone signal. Note that in this case the original sources s, $n_1, n_2, \ldots, n_M$ are assumed to be point sources so that the signal paths can be modeled by FIR filters. In the following, for simplicity, a time argument k for all signals in the time domain is omitted and time-domain signals are represented by lower-case letters.

The BSS of the component B is desired to find a corresponding demixing system W to extract the individual sources from the mixed signals. Output signals of the demixing system $y_i(k)$, i=1, 2 are described by:

$$y_i = w_{1i} * x_1 + w_{2i} * x_2, \tag{2}$$

where $w_{ji}$ denotes the demixing filter from the j-th microphone to the i-th output channel.

There are different criteria for the convolutive source separation proposed. They are all based on the assumption that the sources are statistically independent and can all be used for the invention, although with different effectiveness. In the proposed system, the "TRINICON" criterion for second-order statistics [BAK05] is used as the BSS optimization criterion, where the cost function $J_{BSS}(W)$ aims at reducing the off-diagonal elements of the correlation matrix of the two BSS outputs:

$$R_{yy}(k)=\begin{bmatrix} R_{y_1y_1(k)} & R_{y_1y_2(k)} \\ R_{y_2y_1(k)} & R_{y_2y_2(k)} \end{bmatrix}. \tag{3}$$

For I=j=2, in each output channel one source can be suppressed by a spatial null. Nevertheless, for the underdetermined scenario no unique solution can be achieved. However, in this case Applicants exploit a new application of BSS, i.e, its function as a blocking matrix to generate an interference estimate. This can be done by using the Directional BSS 11, where a spatial null can be forced to a certain direction for assuring that the source coming from this direction is suppressed well after the Directional BSS 11.

The basic theory for the Directional BSS 11 is described in [PA02], where the given demixing matrix is:

$$W=\begin{bmatrix} w_{11} & w_{21} \\ w_{12} & w_{22} \end{bmatrix}=\begin{bmatrix} w_1^T \\ w_2^T \end{bmatrix}, \tag{4}$$

where $w^T_i=[w_{1i}\ w_{2i}]$ (i=1, 2) includes the demixing filter for the i-th BSS-output channel and is regarded as a beamformer, having a response which can be constrained to a particular orientation θ, that denotes the target source location and is assumed to be known in [PA02]. In the proposed system, Applicants designate a "blind" Directional BSS in component B, where θ is not a priori known, but can be detected from a Shadow BSS 12 algorithm as described in the next section. In order to explain the algorithm, the angle θ is supposed to be given. The algorithm for a two-microphone setup is derived as follows:

For a two-element linear array with omni-directional sensors and a far-field source, the array response depends only on the angle θ=θ(q) between the source and the axis of the linear array:

$$d(q)=d(\theta)=e^{-j\frac{p}{c}\omega sin\theta}=\begin{bmatrix} e^{-jp_1\frac{\omega}{c}sin\theta} \\ e^{-jp_2\frac{\omega}{c}sin\theta} \end{bmatrix}, \tag{5}$$

where d(q) represents the phases and magnitude responses of the sensors for a source located at q, p is the vector of the sensor position of the linear array and c is the sound propagation speed.

The total response for the BSS-output channel i is given by:

$$r=w_i^T d(\theta). \tag{6}$$

Constraining the response to an angle θ is expressed by:

$$WD(\theta)=\begin{bmatrix} w_1^T d(\theta) \\ w_2^T d(\theta) \end{bmatrix}=C. \tag{7}$$

The geometric constraint C is introduced into the cost function:

$$J_C(W)=\|WD(\theta)-C\|_F^2, \tag{8}$$

where $\|A\|_F^2=\text{trace}\{AA^H\}$ is the Frobenius norm of the matrix A.

The cost function can be simplified by the following conditions:

1. Only one BSS output channel should be controlled by the geometric constraint. Without loss of generality the output channel 1 is set to be the controlled channel. Hence, $w^T_2d(\theta)$ is set to be zero in such a way that only $w^T_1$, not $w^T_2$ is influenced by $J_C(W)$.
2. In [PA02], the geometric constraint is suggested to be C=I, where I is the identity matrix, which indicates emphasizing the target source located at the direction of θ and attenuating other sources. In the proposed system, the target source should be suppressed like in a null-steering beam-forming, i.e. a spatial null is forced to the direction of the target source. Hence, in this case the geometric constraint C is equal to the zero-matrix.

Thus, the cost function $J_C(W)$ is simplified to be:

$$J_C(W)=\left\|\begin{matrix} w_1^T d(\theta) \\ 0 \end{matrix}\right\|^2. \tag{9}$$

Moreover, the BSS cost function $J_{BSS}(W)$ will be expanded by the cost function $J_C(W)$ with the weight $\eta_c$:

$$J(W)=J_{BSS}(W)+\eta_C J_C(W). \tag{10}$$

In this case, the weight $\eta_C$ is selected to be a constant, typically in the range of [0.4, . . . , 0.6] and indicates how important $J_C(W)$ is. By forming the gradient of the cost function J(W) with respect to the demixing filter $w^*_{j,i}$ we can obtain the gradient update for W:

$$\begin{aligned} \frac{\partial J(W)}{\partial W^*} &= \frac{\partial J_{BSS}(W)}{\partial W^*}+\eta_C\frac{\partial J_C(W)}{\partial W^*} \\ &= \frac{\partial J_{BSS}(W)}{\partial W^*}+\eta_C\begin{bmatrix} \frac{\partial J_C(W)}{\partial w_{11}^*} & \frac{\partial J_C(W)}{\partial w_{21}^*} \\ \frac{\partial J_C(W)}{\partial w_{12}^*} & \frac{\partial J_C(W)}{\partial w_{22}^*} \end{bmatrix} \\ &= \frac{\partial J_{BSS}(W)}{\partial W^*}+ \\ &\quad \eta_C\begin{bmatrix} w_{11}+w_{12}e^{-j(p_2-p_1)\frac{\omega}{c}sin\alpha} & w_{11}e^{-j(p_2-p_1)\frac{\omega}{c}sin\alpha}+w_{21} \\ 0 & 0 \end{bmatrix} \end{aligned} \tag{11}$$

Using $$\frac{\partial J_C(W)}{\partial W^*},$$

only the demixing filters $\omega_{11}$ and $\omega_{21}$ are adapted. In order to prevent the adaptation of $\omega_{11}$, the adaptation is limited to the demixing filter $\omega_{21}$:

$$\begin{aligned} \frac{\partial(W)}{\partial W^*} &= \frac{\partial J_{BSS}(W)}{\partial W^*}+\eta_C\frac{\partial J_C(W)}{\partial W^*} \\ &= \frac{\partial J_{BSS}(W)}{\partial W^*}+\eta_C\begin{bmatrix} 0 & w_{11}e^{-j(p_2-p_1)\frac{\omega}{c}sin\alpha}+w_{21} \\ 0 & 0 \end{bmatrix} \end{aligned} \tag{12}$$

In the previous section, the angular position θ of the target source is assumed to be known a prior. But in practice, this information is unknown. In order to ascertain that the target source is active and to obtain the geometric information of the target source, a method of 'peak' detection is used to detect the source activity and position which will be described in the following:

Usually, the BSS adaptation enhances one peak (spatial null) in each BSS channel in such a way that one source is suppressed by exactly one spatial null, where the position of the peak can be used for the source localization. Based on this observation, if a source in a defined angular range is active, a peak must appear in the corresponding range of the demixing filter impulse responses. Hence, supposing that only one possibly active source in the target angular range exists, we can detect the source activity by searching the peak in the range and compare this peak with a defined threshold to indicate whether the target source is active or not. Meanwhile, the position of the peak can be converted to the angular information of the target source. However, once the BSS of component B is controlled by the geometric constraint, the peak will always be forced into the position corresponding to the angle θ, even if the target source moves from θ to another position. In order to detect the source location fast and reliably, a shadow BSS 12 without geometric constraint running in parallel to the main Directional BSS 11 is introduced, which is constructed to react fast to varying source movement by virtue of its short filter length and periodical re-initialization. As is shown in FIG. 2, the Shadow BSS 12 detects the movement of the target source and gives its current position to the Directional BSS 11. In this way, the Directional BSS 11 can apply the geometric constraint according to the given θ and follows the target source movement.

In the underdetermined scenario for a two-microphone setup, one target point source s and M interfering point sources $n_m$, m=1, . . . , M are passed through the mixing matrix. The microphone signals are given by equation (1) and the BSS output signals are given by equation (2). By applying the Directional BSS 11, the target source s is well suppressed in one output, e.g. $y_1$. Thus, the output $y_1$ of the Directional BSS 11 can be approximated by:

$$y_1 \approx w_{11} * x_{1,n} + w_{21} * x_{2,n} \approx \sum_{m=1}^{M} \hat{n}_m, \tag{13}$$

where $x_{j,n}$(j=1, 2) denotes the sum of all of the interfering components contained in the j-th microphone. If we take a closer look at $y_1 \approx \omega_{11} * x_{1,n} + \omega_{21} * x_{2,n}$, actually, it can be regarded as a sum of the filtered version the interfering components contained in the microphone signals. Thus, we consider such a Wiener filter, where the input signal is the sum of two microphone signals $x_1+x_2$, and the desired signal is the sum of the target source components contained in two microphone signals $x_{1,s}+x_{2,s}$.

Assuming that all sources are statistically independent, in the frequency domain, the Wiener filter can be calculated as follows:

$$\begin{aligned} H_W &= \frac{\Phi_{(x_1+x_2)(x_{1,s}+x_{2,s})}}{\Phi_{(x_1+x_2)(x_1+x_2)}} \\ &= \frac{\Phi_{(x_{1,s}+x_{2,s})(x_{1,s}+x_{2,s})}}{\Phi_{(x_1+x_2)(x_1+x_2)}} \\ &= 1 - \frac{\Phi_{(x_{1,n}+x_{2,n})(x_{1,n}+x_{2,n})}}{\Phi_{(x_1+x_2)(x_1+x_2)}}, \end{aligned} \tag{14}$$

where the frequency argument Ω is omitted, $\phi_{xy}$ denotes the cross power spectral density (PSD) between x and y, and $x_{1,n}+x_{2,n}$ denotes the sum of all of the interfering components contained in two microphone signals. As mentioned above, $y_1$ is regarded as a sum of the filtered versions of the interfering components contained in the microphone signals. Thus, $y_1$ is supposed to be a good approximation for $x_{1,n}+x_{2,n}$. In Applicants' proposed system, Applicants use $y_1$ as the interference estimate to calculate the Wiener filter and approximate $x_{1,n}+x_{2,n}$ by $y_1$:

$$\begin{aligned} H_W &= 1 - \frac{\Phi_{(x_{1,n}+x_{2,n})(x_{1,n}+x_{2,n})}}{\Phi_{(x_1+x_2)(x_1+x_2)}} \\ &\approx 1 - \frac{\Phi_{y_1 y_1}}{\Phi_{(x_1+x_2)(x_1+x_2)}}. \end{aligned} \tag{15}$$

Furthermore, to obtain the binaural outputs of the target source $\hat{S}=[\hat{S}_L,\hat{S}_R]$ both of the left and right microphone signals $x_1$, $x_2$ will be filtered by the same Wiener filter 14 as shown in FIG. 2. Due to the linear-phase property of $H_W$, in $\hat{s}$ the binaural cues are perfectly preserved not only for the target component but also for the residual of the interfering components.

The applicability of the proposed system was verified by experiments and a prototype of a binaural hearing aid (computer-based real-time demonstrator). The experiments have been conducted using speech data convolved with the impulse responses of two real rooms with $T_{60}$=50, 400 ms respectively and a sampling frequency of $f_s$=16 kHz. A two-element microphone array with an inter-element spacing of 20 cm was used for the recording. Different speech signals of 10 s duration were played simultaneously from 2-4 loudspeakers located at 1.5 m distance from the microphones. The signals were divided into blocks of length 8192 with successive blocks overlapped by a factor of 2. The length of the main BSS filter was 1024. The experiments were conducted for 2, 3 and 4 active sources individually.

In order to evaluate the performance, the signal-to-interference ratio (SIR) and the logarithm of speech-distortion factors (SDF)

$$SDF = 10\log_{10}\frac{\text{var}\{x_s - h_W * x_s\}}{\text{var}\{x_s\}}$$

averaged over both channels was calculated for the total 10 s signal.

TABLE 1

Comparison of SDF and ΔSIR for 2, 3, 4 active sources in two different rooms (measured in dB)

| number of the sources | | 2 | 3 | 4 |
|---|---|---|---|---|
| anechoic room | SIR_In | 5.89 | −0.67 | −2.36 |
| $T_{60}$ = 50 ms | SDF | −14.55 | −7.12 | −6.64 |
| | ΔSIR | 6.29 | 6.33 | 3.05 |
| reverberant room | SIR_In | 5.09 | −0.85 | −2.48 |
| $T_{60}$ = 400 ms | SDF | −13.60 | −5.94 | −6.23 |
| | ΔSIR | 6.13 | 5.29 | 3.58 |

Table 1 shows the performance of the proposed system. It can be seen that the proposed system can achieve about 6 dB SIR improvement (ΔSIR) for 2 and 3 active sources and 3 dB SIR improvement for 4 active sources. Moreover, in the sound examples the musical tones and the artifacts can hardly be perceived due to the combination of the improved interference estimation and corresponding Wiener filtering.

The invention claimed is:

1. A method for noise reduction of a binaural microphone signal ($x_1$, $x_2$) with one target point source and M interfering point sources ($n_1, n_2, \ldots, n_M$) as input sources to a left and a right microphone of a binaural microphone system, the method comprising the following step:

filtering a left and a right microphone signal ($x_1$, $x_2$) by a Wiener filter to obtain binaural output signals ($\hat{s}_L, \hat{s}_R$) of the target point source, where the Wiener filter is calculated as:

$$H_W = 1 - \frac{\Phi_{(x_{1,n}+x_{2,n})(x_{1,n}+x_{2,n})}}{\Phi_{(x_1+x_2)(x_1+x_2)}},$$

where $H_W$ is the Wiener filter, $\Phi_{(x_{1,n}+x_{2,n})(x_{1,n}+x_{2,n})}$ is an auto power spectral density of a sum of all of the M interfering point sources components ($x_{1,n}$, $x_{2,n}$) contained in the left and right microphone signals ($x_1$, $x_2$) and $\Phi_{(x_1+x_2)(x_1+x_2)}$ is an auto power spectral density of a sum of left and right microphone signals ($x_1$, $x_2$).

2. The method according to claim 1, which further comprises approximating the sum of all of the M interfering point sources components ($x_{1,n}$, $x_{2,n}$) contained in the left and right microphone signals ($x_1$, $x_2$) by an output ($y_1$) of a blind source separation with the left and right microphone signals ($x_1$, $x_2$) as input signals.

3. The method according to claim 2, wherein the blind source separation includes a directional blind source separation algorithm and a shadow blind source separation algorithm.

4. An acoustic signal processing system, comprising:

a binaural microphone system with a left microphone having a left microphone signal ($x_1$) and a right microphone having a right microphone signal ($x_2$); and a Wiener filter unit for noise reduction of a binaural microphone signal ($x_1$, $x_2$) with one target point source and M interfering point sources ($n_1, n_2, \ldots, n_M$) as input sources to said left and said right microphones;

said Wiener filter unit having an algorithm calculated as:

$$H_W = 1 - \frac{\Phi_{(x_{1,n}+x_{2,n})(x_{1,n}+x_{2,n})}}{\Phi_{(x_1+x_2)(x_1+x_2)}},$$

where $\Phi_{(x_{1,n}+x_{2,n})(x_{1,n}+x_{2,n})}$ is an auto power spectral density of a sum of all of the M interfering point sources components ($x_{1,n}$, $x_{2,n}$) contained in the left and right microphone signals ($x_1$, $x_2$) and $\Phi_{(x_1+x_2)(x_1+x_2)}$ is an auto power spectral density of a sum of the left and right microphone signals ($x_1$, $x_2$); and the left microphone signal ($x_1$) of said left microphone and the right microphone signal ($x_2$) of said right microphone being filtered by said Wiener filter unit to obtain binaural output signals ($\hat{S}_L, \hat{S}_R$) of the target point source.

5. The acoustic signal processing system according to claim 4, which further comprises a blind source separation unit having an output ($y_1$), the sum of all of the M interfering point sources components ($x_{1,n}$, $x_{2,n}$) contained in the left and right microphone signals ($x_1$, $x_2$) being approximated by the output ($y_1$) of said blind source separation unit with the left and right microphone signals ($x_1$, $x_2$) as input signals.

6. The acoustic signal processing system according to claim 5, wherein said blind source separation unit includes a directional blind source separation unit and a shadow blind source separation unit.

7. The acoustic signal processing system according to claim 4, wherein said left and right microphones are located in different hearing aids.

8. The acoustic signal processing system according to claim 5, wherein said left and right microphones are located in different hearing aids.

9. The acoustic signal processing system according to claim 6, wherein said left and right microphones are located in different hearing aids.

* * * * *